US011082426B2

(12) United States Patent
Yedidi et al.

(10) Patent No.: US 11,082,426 B2
(45) Date of Patent: *Aug. 3, 2021

(54) IDENTIFYING ACCOUNTS HAVING SHARED CREDENTIALS

(71) Applicant: Dropbox, Inc., San Francisco, CA (US)

(72) Inventors: Kapil Yedidi, San Francisco, CA (US); Anton Mityagin, San Francisco, CA (US); Sean Byrne, San Francisco, CA (US); Andrew Scheff, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/576,006

(22) Filed: Sep. 19, 2019

(65) Prior Publication Data

US 2020/0014687 A1 Jan. 9, 2020

Related U.S. Application Data

(63) Continuation of application No. 15/166,194, filed on May 26, 2016, now Pat. No. 10,469,497.

(51) Int. Cl.
*H04L 29/06* (2006.01)

(52) U.S. Cl.
CPC ........ *H04L 63/0884* (2013.01); *H04L 63/083* (2013.01); *H04L 63/0876* (2013.01)

(58) Field of Classification Search
CPC .................. H04L 63/0884; H04L 63/083; H04L 63/0876
See application file for complete search history.

(56) References Cited

U.S. PATENT DOCUMENTS

| 8,285,658 | B1 | 10/2012 | Kellas-Dicks et al. |
| 9,032,526 | B2 | 5/2015 | Wang et al. |
| 9,066,227 | B2 | 6/2015 | Spencer et al. |
| 9,092,616 | B2 | 7/2015 | Kumar et al. |
| 9,251,464 | B1 | 2/2016 | Kellas-Dicks et al. |
| 9,454,771 | B1 | 9/2016 | Agrawal et al. |
| 9,483,805 | B1 | 11/2016 | Fieldman |
| 9,699,203 | B1 | 7/2017 | Yang |
| 9,767,488 | B1 | 9/2017 | Wang |
| 9,842,204 | B2 | 12/2017 | Bailey |
| 9,870,464 | B1 | 1/2018 | Kane-Parry et al. |
| 9,912,676 | B1 | 3/2018 | Fieldman |
| 10,033,727 | B1 * | 7/2018 | Fieldman ................ H04L 63/08 |
| 2006/0098795 | A1 | 5/2006 | Choti et al. |

(Continued)

*Primary Examiner* — Ali S Abyaneh
*Assistant Examiner* — Shu Chun Gao
(74) *Attorney, Agent, or Firm* — DLA Piper LLP (US)

(57) ABSTRACT

Disclosed are systems, methods, and non-transitory computer-readable storage media for identifying accounts having shared credentials. In some implementations, a content management system can collect user login context data when a user logs in to or accesses a user account of the content management system. For example, the content management system can collect client device data, client application data, internet protocol (IP) address data, and/or other data from the user's device when the user logs in to the user account. The content management system can analyze the login context data to determine patterns that indicate that the user account login credentials are being shared among multiple users.

20 Claims, 6 Drawing Sheets

(56) References Cited

U.S. PATENT DOCUMENTS

| | | |
|---|---|---|
| 2006/0195604 A1 | 8/2006 | Goodman et al. |
| 2008/0077530 A1 | 3/2008 | Banas et al. |
| 2010/0306832 A1 | 12/2010 | Mu et al. |
| 2013/0074164 A1 | 3/2013 | Bartlett |
| 2014/0229273 A1 | 8/2014 | Garcia-Martinez et al. |
| 2014/0257999 A1 | 9/2014 | Garcia-Martinez |
| 2014/0325646 A1 | 10/2014 | Turgeman et al. |
| 2014/0376705 A1 | 12/2014 | Layman et al. |
| 2016/0006720 A1 | 1/2016 | Spaulding |
| 2017/0206552 A1 | 7/2017 | Rajkumar et al. |
| 2017/0244689 A1* | 8/2017 | Cetlur ................ G06F 21/552 |
| 2017/0264673 A1 | 9/2017 | Yalunin |
| 2017/0346821 A1 | 11/2017 | Yedidi et al. |

* cited by examiner

| Account ID | Timestamp | IP Address | Browser ID | Client ID | OS | Device Type | Session ID |
|---|---|---|---|---|---|---|---|
| sf1@sfmc.org | 20160203:0815 | 123.456.789.101 | NetBrowser 1.0 | Desktop 3.1 | OS_A 4.3 | Dev1 | 1 |
| sf1@sfmc.org | 20160203:0817 | 444.555.666.777 | WebWalker 2.2 | MobileA 4.2 | OS_B 2.1 | Dev2 | 2 |
| sf1@sfmc.org | 20160203:0820 | 123.456.789.101 | NetBrowser 1.0 | Desktop 3.1 | OS_A 4.3 | Dev1 | 1 |
| sf1@sfmc.org | 20160203:0822 | 222.333.444.555 | Expedition 3.6 | MobileB 5.4 | OS_C 6.4 | Dev3 | 3 |
| sf1@sfmc.org | 20160203:0823 | 666.777.888.999 | WebWalker 2.2 | MobileA 3.1 | OS_B 1.2 | Dev2 | 4 |
| sf1@sfmc.org | 20160203:0827 | 123.456.789.101 | NetBrowser 1.0 | Desktop 3.1 | OS_A 4.3 | Dev1 | 1 |

IDENTIFYING ACCOUNTS HAVING SHARED CREDENTIALS

CROSS-REFERENCE TO RELATED APPLICATION INFORMATION

This is a continuation of U.S. patent application Ser. No. 15/166,194, filed May 26, 2016, which is incorporated herein by reference in its entirety.

BACKGROUND

Modern computing systems allow users to share content in many ways. Users can exchange emails, exchange storage devices, and use various network services to share and exchange data. For example, a user can create an account with an online content management system that allows the user to store, edit, and share content items with other users who may or may not have accounts with the online content management system. While the online content management system may be configured to service one user per account, users have come to realize that they can share data with other users by sharing the login credentials for the same account. For example, a first user can create a user account with the content management system, store content items in the user account, and then share the login credentials required to log in to the user account with a second user so that the second user can access the stored content items.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for identifying accounts having shared credentials. In some implementations, a content management system can collect user login context data when a user logs in to or accesses a user account of the content management system. For example, the content management system can collect client device data, client application data, internet protocol (IP) address data, and/or other data from the user's device when the user logs in to the user account. The content management system can analyze the login context data to determine patterns that indicate that the user account login credentials are being shared among multiple users.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for identifying accounts having shared credentials. When users share credentials to a single content management system account, it may be difficult for the content management system to detect or determine that the user account is being shared between multiple users. The technology describe herein provides a mechanism by which shared user accounts and/or shared login credentials can be detected.

Figure 1:
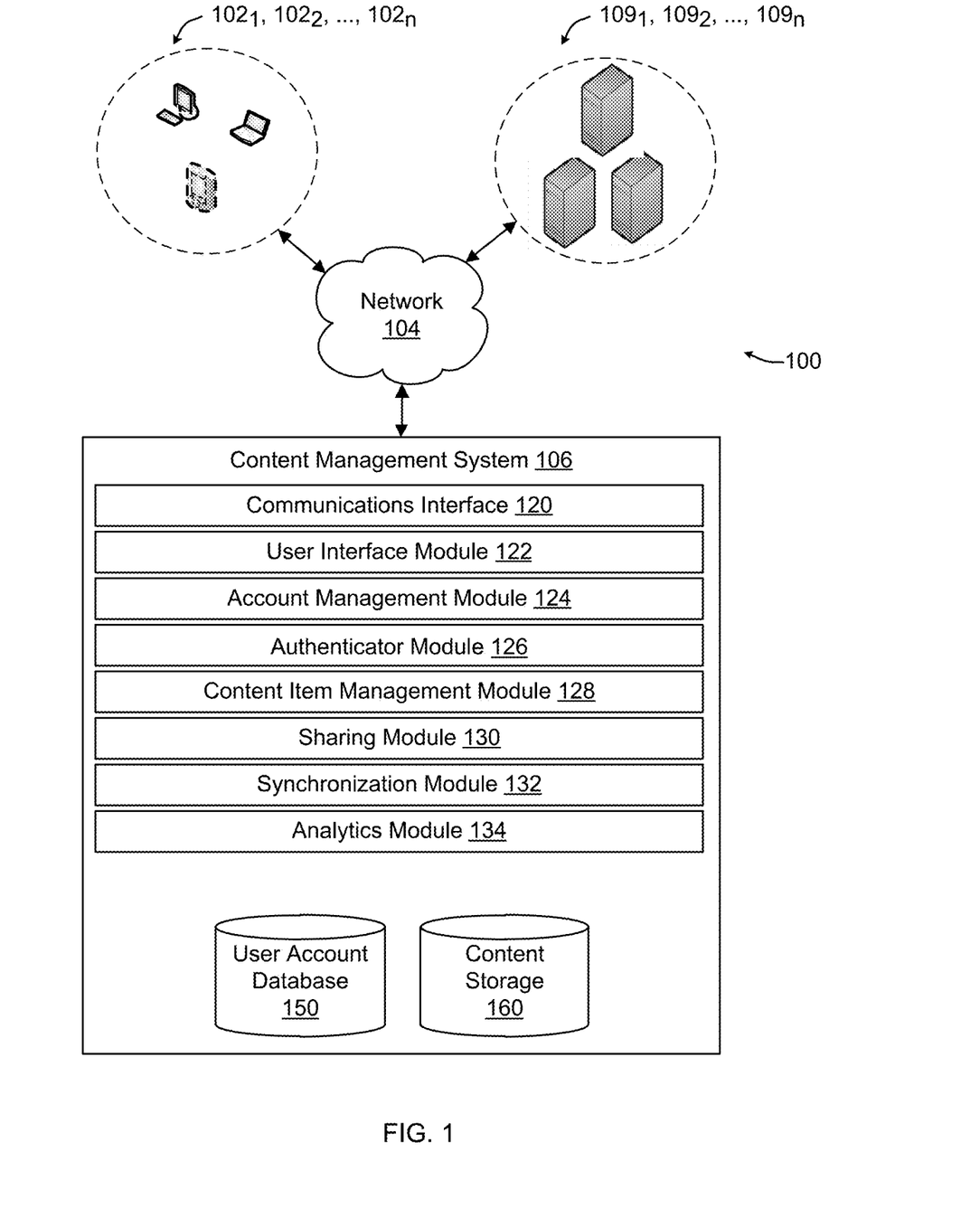
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2, \ldots, 102_a$ (collectively "102") connected to network 104 by direct and/or indirect communication. Content management system 106 can include a single computing device (e.g., a server) or multiple computing devices (e.g., multiple servers) that are configured to perform the functions and/or operations necessary to provide the services described herein. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content items, as well as perform a variety of content management tasks, such as retrieve, modify, browse, and/or share the content items. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, text files, audio files, video files, etc., from one or more client devices 102 authorized on the account. The content items can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items from one or more client devices 102. The synchronization can be platform agnostic. That is, the content items can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content items that have been updated at content management system 106 and synchronize those changes to the local collection. The client software can provide notifications of synchronization operations, and can provide indications of content statuses directly within the content management application. Sometimes client device $102_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers 109$_1$, 109$_2$, . . . , 109$_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

Figure 2:
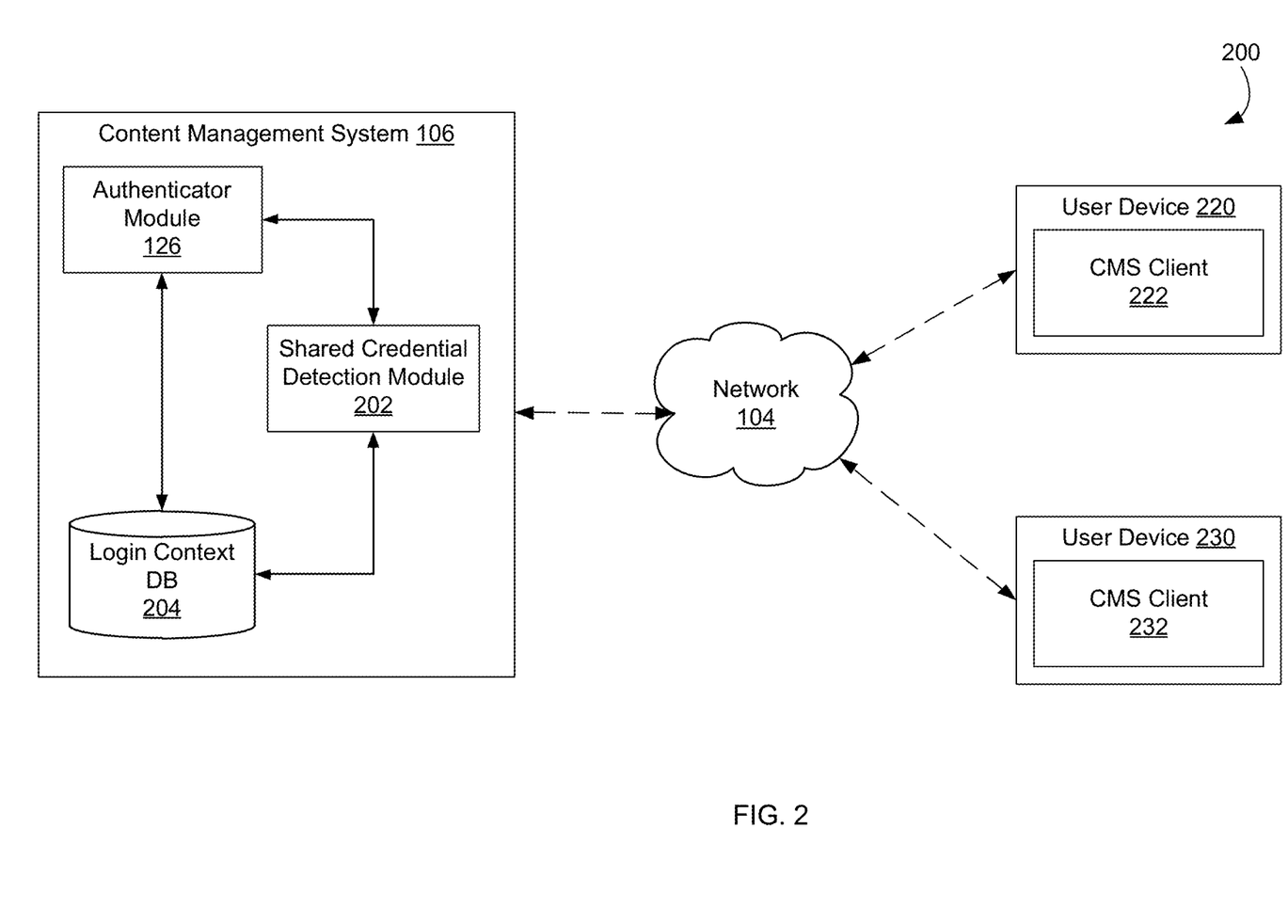
FIG. 2 is a block diagram of an example system for identifying accounts having shared credentials.

FIG. 2 is a block diagram of an example system 200 for identifying accounts having shared credentials. For example, system 200 can correspond to system configuration 100 of FIG. 1.

In some implementations, system 200 can include content management system 106. For example, users of content management system 106 can sign up or register for accounts with content management system 106 to gain access to the features and services provided by content management system 106. For example, a user can interact with content management system 106 through a web interface using a web browser running on user device 220 to create a user account with content management system 106. When creating the account, the user can configure the user account with an account identifier (e.g., user name, email address, etc.) and a password (e.g., a string of characters, numbers, letters, etc.) that can be used by content management system 106 to authenticate the user as the owner of the user account (e.g., according to well-known mechanisms). After creating the user account, the user can create, store, and/or share content items using the features and services provided by content management system 106.

In some implementations, content management system 106 can include authenticator module 126. As described above, authenticator module 126 can be configured to authenticate a user to confirm that the user should be granted access to a user account. For example, a user of user device 220 (or user device 230) can use content management system client (CMS) 222 (or CMS client 232) to log in to content management system 106. User device 220 can, for example, correspond to client device $102_i$ of FIG. 1. CMS client 222 can, for example, be a native client built to operate on user device 220. CMS client 222 can be a web browser that presents a web client interface on user device 222. The user can provide input to user device 220 to provide the account identifier and password for the user's user account on content management system 106. User device 230 can be configured similarly to user device 220 and can also be used to log in to content management system 106. When content management system 106 receives the account identifier and password, authenticator module 126 can authenticate the user as the owner of the identified account based on the password.

In some implementations, content management system 106 can store historical login context data. For example, whenever a user logs in to a user account on content management system 106, authenticator module 126 can store login context data in login context database 204. When a user (e.g., using CMS client 222 on user device 220, or CMS client 232 on user device 230) logs in to content management system 106, authenticator module 126 can create a time-stamped record in login context database 204 that includes login context data for the current session (e.g., connection) with content management system 106. The login context data can include device information, such as device type, device identifier, device configuration, etc. The login context data can include software information, such as operating system identifier, operating system settings, client application identifier, client application settings, etc. The login context data can include network information, such as the IP address of the device, communication session information, etc. When multiple users are using different devices (e.g., user device 220, user device 230, etc.) at different locations login context database 204 will have records indicating that different devices having different configurations accessed content management system 106 from different locations. This information can be used to detect and or identify accounts where the user login credentials have been shared amongst different users.

In some implementations, content management system 106 can include shared credential detection module 202. For example, shared credential detection module 202 can detect when a single user account is being shared by multiple users based on the login context data stored in login context database 204. Shared credential detection module 202 can, for example, analyze historical log in context data periodically (e.g., based on a time interval) to determine whether the log in credentials for the user account are being shared among multiple users. Shared credential detection module 202 can, for example, analyze historical log in context data in response to a user logging in to a user account to determine whether the log in credentials for the user account are being shared among multiple users. For example, authenticator module 126 can send a message to shared credential module 202 when a user logs in to a user account to cause shared credential detection module 202 to perform the analysis of the historical log in context data. Shared credential detection module 202 can, for example, analyze historical log in context data in response to login context database 204 being updated with new log in context data to determine whether the log in credentials for the user account are being shared among multiple users.

When shared credential detection module 202 determines that a single user account is being shared by multiple users, shared credential detection module 202 can send a message to authenticator module 126 indicating that the single user account is being shared by multiple users. Authenticator module 126 (or other component of content management system 106) can present a notification to the user indicating that sharing a single account with multiple users is in violation of content management system policy the user next time the user logs in to the user account. In some implementations, authenticator module 126 can prevent the user from accessing the user account in response to receiving the message from shared credential detection module 202 indicating that the single user account is being shared by multiple users.

Figure 3:
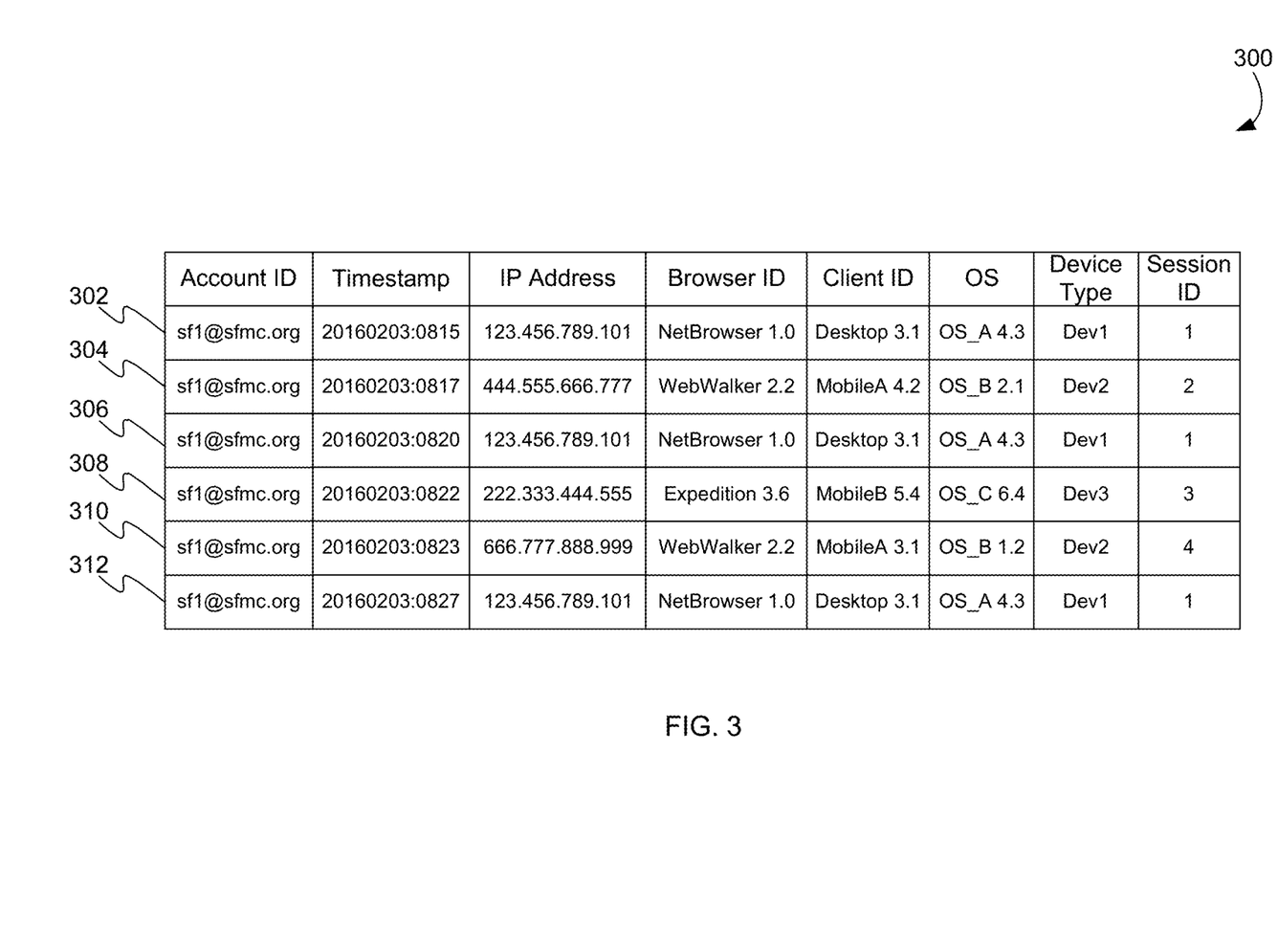
FIG. 3 illustrates an example login context database.

FIG. 3 illustrates an example login context database 300. For example, database 300 can correspond to database 204 of FIG. 2. For ease of explanation, login context database 300 depicted in FIG. 3 only includes records for a single user account (e.g., "sf1 @sfmc.org"). However, login context database 300 will typically include login context data for each of the user accounts managed by content management system 106. Each record (e.g., records 302-312) in login context database 300 can correspond to a respective login event and/or authentication attempt for the identified user account. Each record can include a timestamp corresponding to the login event, an IP address corresponding to the client device, a browser identifier (e.g., name, version, etc.), a client application identifier (e.g., name, version, etc.), an operating system identifier (e.g., name version, etc.) for the operating system of the client device, a device type (e.g., manufacturer, model, etc.) for the client device, and/or a session identifier for the current login session between the client device (e.g., CMS client application) and content management system 106.

In some implementations, login context database 300 can include additional context data. For example, login context database 300 can include browser configuration settings, device configuration settings, client application configuration settings, device performance statistics, and/or other device-specific information that can be used (e.g., in combination with the login context data described above) to detect when the same device has logged in to content management system 106. For example, login context database 300 can include secondary device identification characteristics (e.g., other than a device identifier, user identifier, MAC address, IP address, or other primary device or user identifiers, etc.). These secondary device identification characteristics can include, for example, device language settings, display settings, accessories connected to the device, applications installed on the device, web browser plugins installed, CPU specifications, volatile memory size, non-volatile storage size, and/or other subcomponent identifiers, specifications, and/or settings collected from a CMS client device when a user logs in to content management system 106. These secondary device characteristics (e.g., individually or in combination) can be used to create a signature or "fingerprint" for a CMS client device so that content management system 106 (e.g., shared credential detection module 202) can determine or detect when the same device (or different devices) has logged in to content management system 106. This fingerprint allows content management system 106 to identify a CMS client device even when the device identifier, IP address, or other information has been spoofed or disguised.

In some implementations, shared credential detection module 202 can detect that a single user account is being shared by multiple users based on the frequency of authentication attempts recorded for a user account in login context database 300. For example, shared credential detection module 202 can analyze the login context data (e.g., number of login records and corresponding timestamps) in login context database 204 to determine a value based on a login frequency metric representing how many times a user (or multiple users) has logged in to the user account within a period of time (e.g., user login frequency). For example, based on the number of records and the corresponding timestamps, shared credential detection module 202 can determine that a user has logged in 15 times in the previous one hour. When the login frequency metric value (e.g., user login frequency) exceeds a threshold login frequency (e.g., 10 log-ins per hour), shared credential detection module 202 can determine that the user account is being accessed (e.g., shared) by multiple users.

In some implementations, shared credential detection module 202 can detect that a single user account is being shared by multiple users based on the number of client IP addresses recorded for the user account. For example, shared credential detection module 202 can analyze the login context data (e.g., IP addresses) in login context database 204 to determine a value based on an IP addresses metric representing how many different client IP addresses have been recorded for the same user account (e.g., within a period of time). For example, based on the recorded IP addresses, shared credential detection module 202 can determine that a user has logged in from 20 different IP addresses. When the IP addresses metric value (e.g., number of different IP addresses) exceeds a threshold number of IP addresses (e.g., 12 IP addresses), shared credential detection module 202 can determine that the user account is being accessed (e.g., shared) by multiple users.

In some implementations, shared credential detection module 202 can detect that a single user account is being shared by multiple users based on the number of different access locations determined for the user account. For example, shared credential detection module 202 can analyze the login context data (e.g., IP addresses) in login context database 204 to determine a value based on a client location metric representing from how many different locations (e.g., countries, regions, etc.) the user has accessed the single user account (e.g., within a period of time). For example, based on the recorded IP addresses, shared credential detection module 202 can determine the countries or geographic regions from which the user (or multiple users) has accessed the single user account. When the client location metric value (e.g., number of different locations) exceeds a threshold number of locations (e.g., 6 locations), shared credential detection module 202 can determine that the user account is being accessed (e.g., shared) by multiple users.

In some implementations, shared credential detection module 202 can detect that a single user account is being shared by multiple users based on the number of browser types recorded for the user account. For example, users of content management system 105 may log in to content management system 106 using a web client run in a web browser. Shared credential detection module 202 can analyze the login context data (e.g., browser identifiers) in login context database 204 to determine a value based on a browser types metric representing how many different browser types the user has used to access content management system 106 (e.g., within a period of time). For example, based on the recorded browser identifiers, shared credential detection module 202 can determine the different browsers used by the user (or multiple users) to access the single user account. When the browser types metric value (e.g., number of different browser types) exceeds a threshold number of browser types (e.g., 4 browser types), shared credential detection module 202 can determine that the user account is being accessed (e.g., shared) by multiple users.

In some implementations, shared credential detection module 202 can detect that a single user account is being shared by multiple users based on the number of different native CMS clients recorded for the user account. For example, users of content management system 105 may log in to content management system 106 using a native desktop or mobile CMS client run on a CMS client device (e.g., user device 220, user device 230). Shared credential detection module 202 can analyze the login context data (e.g., client identifiers) in login context database 204 to determine a value based on a native clients metric representing how many different CMS client types the user has used to access content management system 106 (e.g., within a period of time). For example, based on the recorded client identifiers, shared credential detection module 202 can determine the different native clients used by the user (or multiple users) to access the single user account. When the native clients metric value (e.g., number of different native client types) exceeds a threshold number of client types (e.g., 4 native client types, versions, etc.), shared credential detection module 202 can determine that the user account is being accessed (e.g., shared) by multiple users.

In some implementations, shared credential detection module 202 can detect that a single user account is being shared by multiple users based on the number of active login sessions recorded for the user account. For example, users of content management system 105 may log in to content management system 106 using a web client, as described above. When the web client is used to log in to content management system 106, content management system 106 can send browser session data (e.g., an HTTP cookie) to the web browser running the web client. Content management system 106 can track the number of browser sessions established using a session identifier, for example. The session identifier can be recorded in login context database 300. Shared credential detection module 202 can analyze the login context data (e.g., session identifiers) in login context database 204 to determine a value based on a login sessions metric representing how many different sessions the user has started to access content management system 106 (e.g., within a period of time). For example, based on the recorded session identifiers, shared credential detection module 202 can determine how many browser sessions were initiated by the user (or multiple users) to access the single user account. When the login sessions metric value (e.g., number of browser sessions) exceeds a threshold number of sessions (e.g., 5 browser sessions) shared credential detection module 202 can determine that the user account is being accessed (e.g., shared) by multiple users.

In some implementations, shared credential detection module 202 can detect that a single user account is being shared by multiple users based on the number of logins received from anonymous proxy servers. For example, users of content management system 105 may log in to content management system 106 through an anonymous proxy server so that the user's activity cannot be traced back to the user or the user's device. Content management system 106 can obtain and store information identifying anonymous proxy IP addresses and compare the IP addresses of client devices stored in login context database 300 to the anonymous proxy IP addresses to determine whether a client device has logged in through an anonymous proxy server. Content management system 106 can analyze the IP addresses in login context database 300 to determine a value based on an anonymous proxy metric representing how many user logins for a single user account originated from an IP address associated with an anonymous proxy server (e.g., within a period of time). When the anonymous proxy metric value (e.g., number of anonymous logins) exceeds a threshold number of anonymous logins, shared credential detection module 202 can determine that the user account is being accessed (e.g., shared) by multiple users.

In some implementations, shared credential detection module 202 can detect that a single user account is being shared by multiple users based on the number of devices used to log in to the user account. For example, users of content management system 105 may log in to content management system 106 using different client devices (e.g., client device 222, client device 232, etc.). While it may be normal that a single user has several client devices (e.g., a smartphone, a laptop computer, a tablet computer, etc.), it is unusual that a single user would use more than 10 different client devices to log in to content management system 106. Thus, content management system 106 can obtain and store login context information that can be used to generate a unique signature of fingerprint for each client device that is used to log in to content management system 106. Content management system 106 can analyze the login context data in login context database 300 to generate client device signatures and determine a value based on a number of devices metric representing how many different client devices were used to log in to the single user account (e.g., within a period of time). When the number of devices metric value (e.g., number of different client devices) exceeds a threshold number of client devices (e.g., 8 devices), shared credential detection module 202 can determine that the user account is being accessed (e.g., shared) by multiple users.

In some implementations, shared credential detection module 202 can determine that a single user account is being shared by multiple users based on a combination of the login context data described above. For example, shared credential detection module 202 can determine that a single user account is being shared among multiple users based on a single context data metric (e.g., frequency of logins only, number of different browsers only, number of different CMS clients only, etc.). Alternatively, shared credential detection module 202 can determine that a single user account is being shared among multiple users based on a combination of context data metrics (e.g., frequency of logins and number of different browsers and number of different CMS clients only, etc.).

In some implementations, the threshold values for login context metrics can be different (e.g., adjusted) based on whether a single metric is used or multiple metrics are used. For example, the frequency of login attempts threshold value can be higher (e.g., 10 attempts per hour) when only the login frequency metric is used to determine that a single user account is being shared and lower (e.g., 6 attempts per hour) when the login frequency metric is combined with other login metrics to determine that a single user account is being shared. For example, a login frequency metric threshold of 10 login attempts per hour may be enough to determine that the single user account is being shared by multiple users without considering the other login context data metrics. However, when the login frequency metric is combined with other metrics (e.g., number of browser types used), a lower login frequency metric (e.g., 6 attempts per hour) may be used to determine that the single user account is being shared among multiple users.

Figure 4:
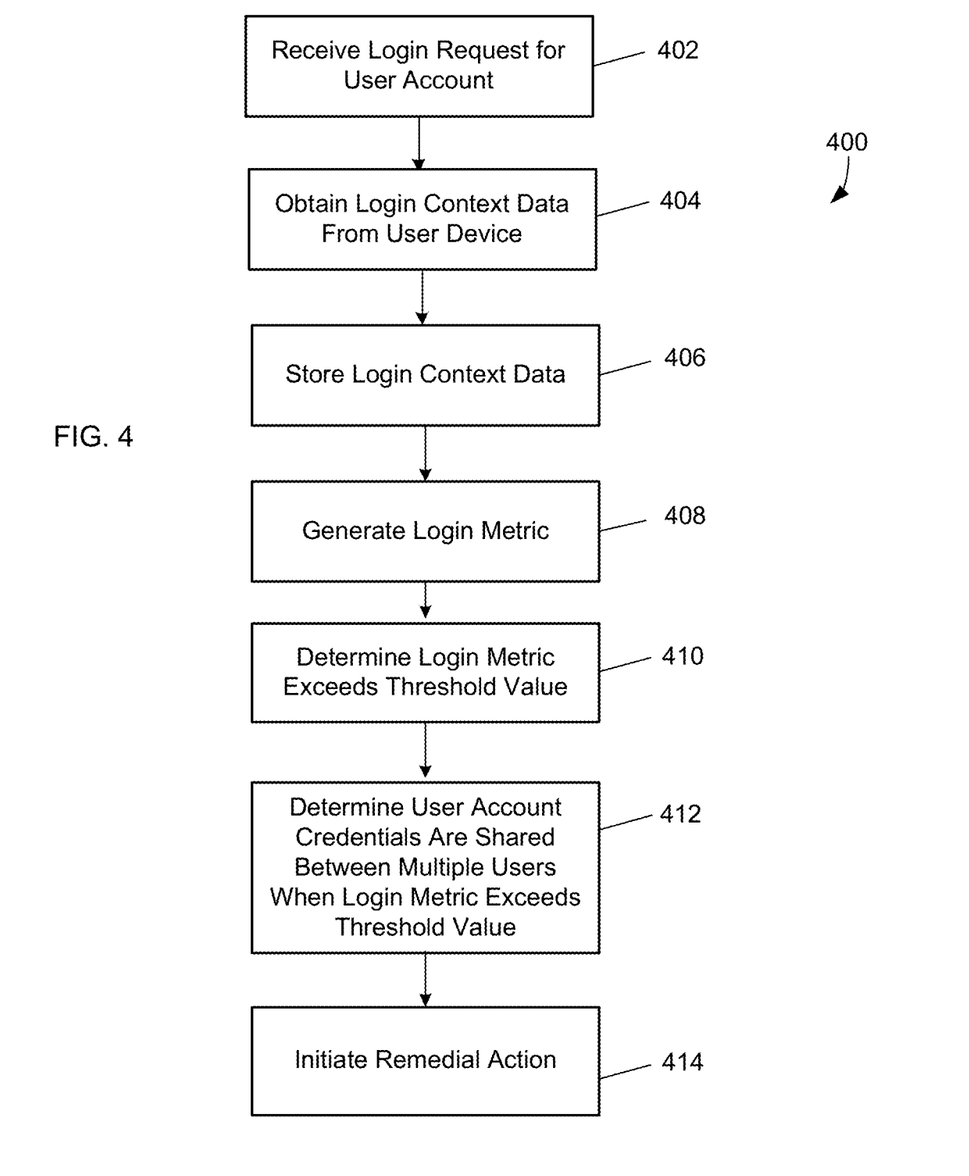
FIG. 4 is a flow diagram of an example process for identifying accounts having shared credentials.

FIG. 4 is a flow diagram of an example process 400 for identifying accounts having shared credentials. For example, content management system 106 can perform process 400 to determine when multiple users are accessing the same user account managed by content management system 106. Content management system 106 can infer that multiple users are using the same account based on login context data that indicates that, for example, multiple different devices in multiple different locations are accessing the same user account. The inference that multiple users are accessing the same account naturally leads to the inference or determination that the login credentials for the user account have been shared among the multiple users.

At step 402, content management system 106 can receive a login request for a user account from a user device. For example, content management system 106 can manage multiple user accounts associated with multiple users. Content management system 106 can receive a log in request from a client device (e.g., user device 220, user device 230) or client devices (e.g., user device 220 and user device 230). The login request can identify an account identifier that uniquely identifies a user account managed by content management system 106. The login request can include a password that can be used by authenticator module 126 to authenticate the user as the owner of the identified user account. After authenticating the user using the account identifier and password, content management system 106 can allow the user to access the identified user account.

At step 404, content management system 106 can obtain login context data from the user device. For example, during the login process (e.g., in the login request) or after the user device logs in to content management system 106 (e.g., while the user device is interacting with content management system 106), content management system 106 can receive login context data from the user device. The content management system client application (e.g. web browser, native application, etc.) can, for example, send data to content management system describing the user device, client application, configuration data, network connection data, etc., as described above.

At step 406, content management system 106 can store login context data. For example, content management system 106 can store login context data in login context database 204. For example, login context database 204 (i.e., database 300) can store a database entry (e.g., record) that includes login context data collected for each attempt to log in to a user account managed by content management system 106.

At step 408, content management system 106 can generate a login metric. For example, content management system 106 can generate one or more login metrics based on the login context data stored in login context database 204. The login metrics can include a login frequency metric, an IP addresses metric, a client location metric, a browser types metric, a native clients metric, a login sessions metric, an anonymous proxy metric, a number of devices metric, and/or other login metrics, as described above.

At step 410, content management system 106 can determine that the generated login metric exceeds a threshold value. For example, each login metric generated by content management system 106 can have a corresponding threshold value that can be used to determine when a user account is being accessed by multiple users. The threshold values can be predetermined or dynamically determined by content management system 106. The threshold value for a particular metric can be adjusted based on whether the login metric is analyzed individually or analyzed in combination with other login metrics. Multiple different threshold values can be configured for a particular metric and used by content management system 106 based on whether the login metric is analyzed individually or analyzed in combination with other login metrics, as described above.

At step 412, content management system 106 can determine that the login credentials for a user account are being shared between multiple users when the generated login metric exceeds a threshold value. For example, content management system 106 can determine or infer that multiple users are using the same user account managed by content management system 106 when one or more login metrics exceed corresponding threshold values, as described above.

At step 414, content management system 106 can initiate remedial action with respect to the user account. For example, content management system 106 can be configured with a use policy that specifies that a single user account can only be accessed or used by a single user. When content management system 106 determines that multiple users are sharing login credentials and accessing a single user account, content management system 106 can present a warning (e.g., when a user attempts to log in to the user account) indicating that the users are in violation of content management system policy and prompting the users to create different, individual accounts with content management system 106. In some implementations, content management system 106 can block access to the user account when multiple users are accessing a single user account.

Figure 5A:
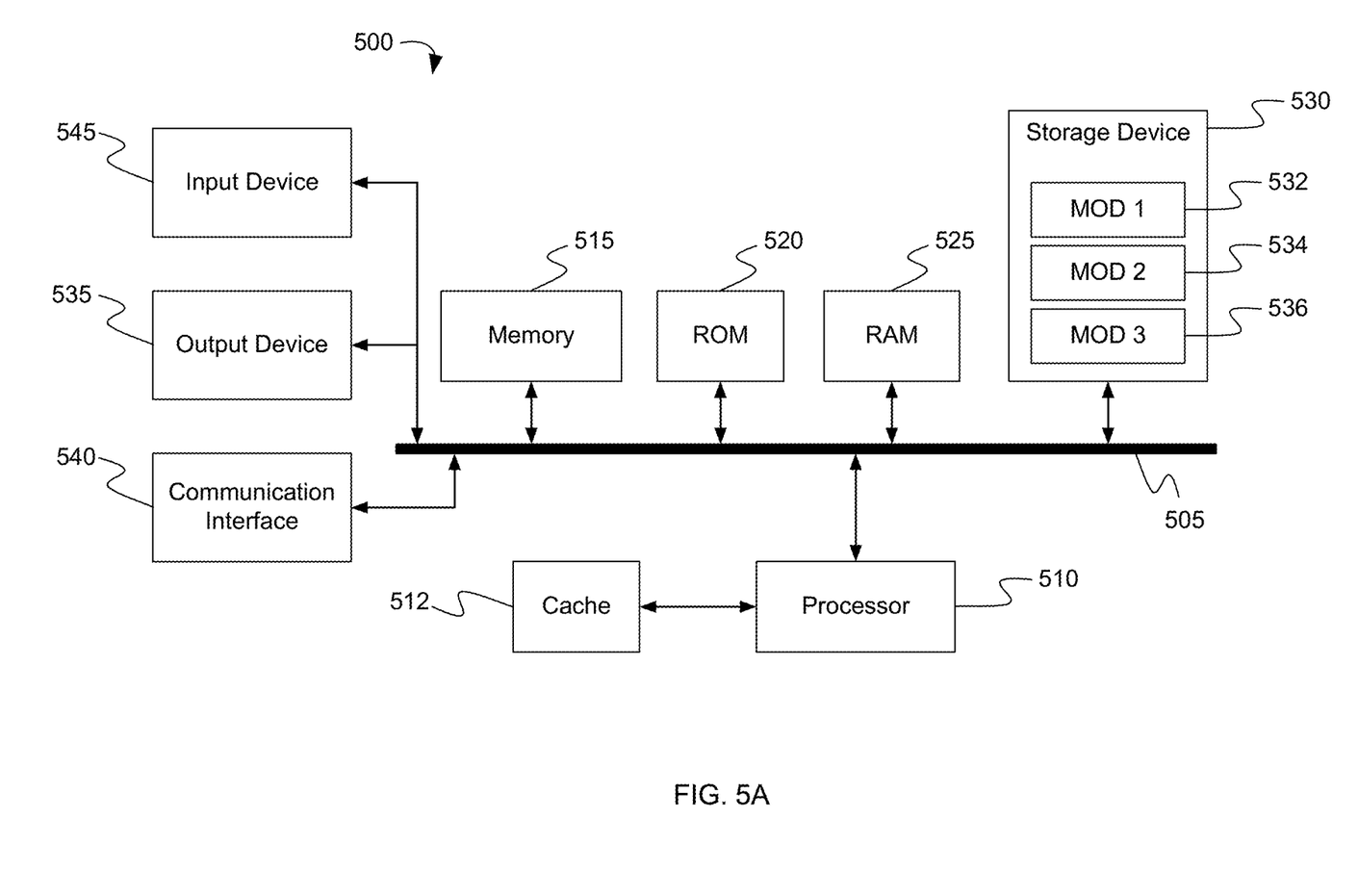
FIG. 5A shows an example possible system embodiment for implementing various embodiments of the present technology.
Figure 5B:
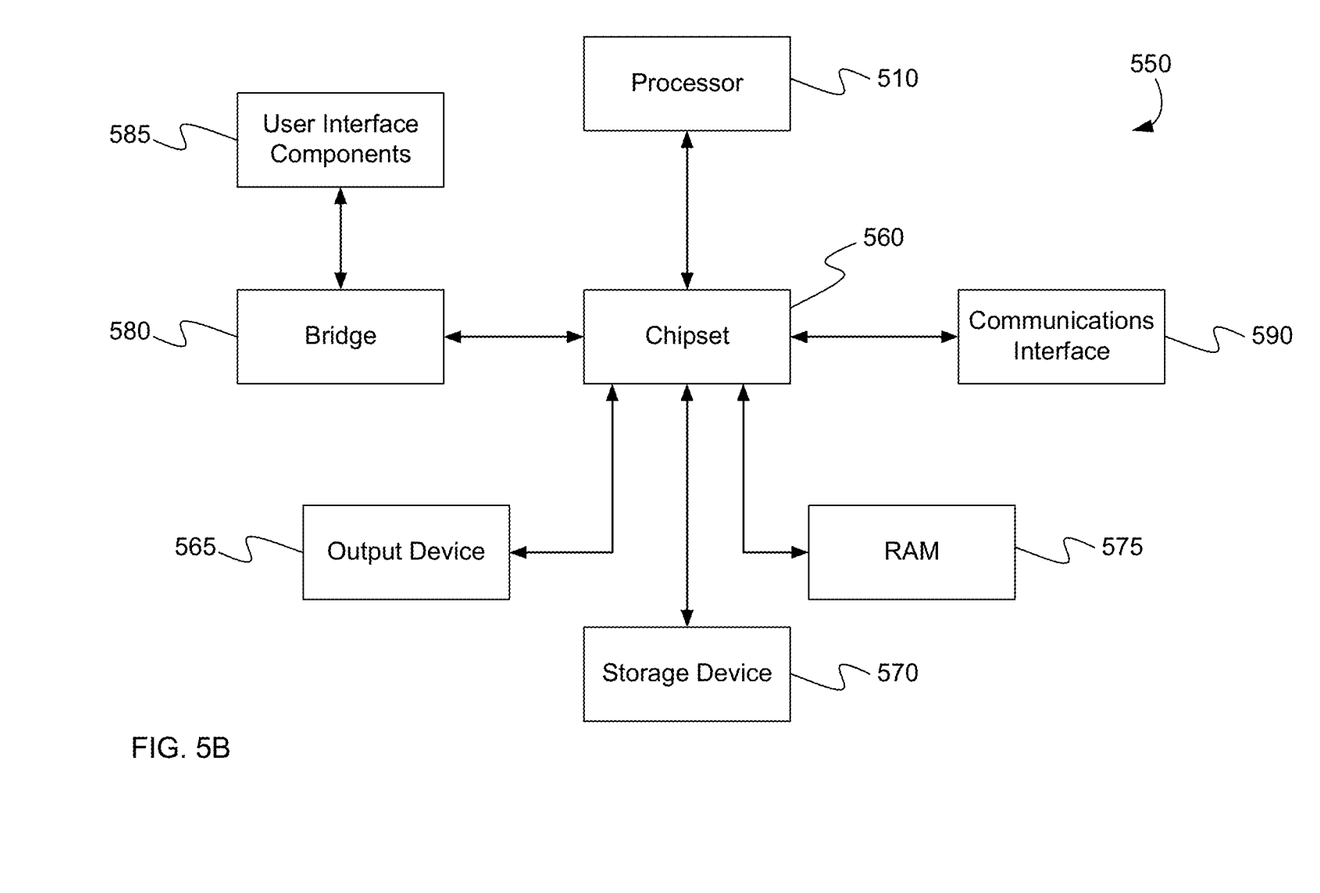
FIG. 5B shows an example possible system embodiment for implementing various embodiments of the present technology.

5A and FIG. 5B show example possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Example system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 510, representative of any number of physically and/or logically distinct resources capable of executing software, firmware, and hardware configured to perform identified computations. Processor 510 can communicate with a chipset 560 that can control input to and output from processor 510. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 510 analyzing data stored in storage 570 or 575. Further, the machine can receive inputs from a user via user interface components 585 and execute appropriate functions, such as browsing functions by interpreting these inputs using processor 510.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    obtaining, by a content management system, login context data from a user device, the login context data corresponding to an attempt to log in to a user account managed by the content management system;
    creating, by the content management system, a fingerprint for the user device;
    storing, by the content management system, the login context data and the fingerprint in association with an account identifier corresponding to the user account in a historical login context data repository, the historical login context data repository including historical login context data corresponding to a plurality of login attempts associated with the user account;
    in response to the attempt to log in to the user account:
        generating, by the content management system, a first value using a first login metric based on the historical login context data for the user account and the fingerprint of the user device associated with the user account that are stored in the historical login context data repository; and
        based on the first value, initiating, by the content management system, remedial action for the user account.

2. The method of claim 1, wherein creating, by the content management system, the fingerprint for the user device, comprises:
    identifying characteristics of the user device that includes at least one of device language settings, display settings, accessories connected to the user device, web browser plugins, processor specifications, volatile memory size, non-volatile memory size, and subcomponent identifiers.

3. The method of claim 1, wherein the first login metric is a login frequency metric, and wherein generating the first value using the login frequency metric comprises:

analyzing the historical login context data for the user account to determine a number of times a user logged in to the user account.

4. The method of claim 1, wherein the first login metric is a browser types metric, and wherein generating the first value using the browser types metric comprises:

analyzing the historical login context data for the user account to determine a number of different browser types used by a user to log in to the user account.

5. The method of claim 1, wherein the first login metric is a native clients metric, and wherein generating the first value using the native clients metric comprises:

analyzing the historical login context data for the user account to determine a number of different clients used by a user to log in to the user account.

6. The method of claim 1, wherein the first login metric is a login sessions metric, and wherein generating the first value using the login sessions metric comprises:

analyzing the historical login context data for the user account to determine a number of different sessions used by a user to log in to the user account.

7. The method of claim 1, wherein the first login metric is an anonymous proxy metric, and wherein generating the first value using the anonymous proxy metric comprises:

analyzing the historical login context data for the user account to determine a number of times a log in to the user account originated from an IP address associated with an anonymous proxy server.

8. The method of claim 1, wherein the first login metric is a number of devices metric, and wherein generating the first value using the number of devices metric comprises:

analyzing the historical login context data for the user account to determine a number of different client devices used to log in to the user account over a threshold period of time.

9. The method of claim 1, wherein initiating, by the content management system, the remedial action for the user account comprises:

denying the user device access to the user account.

10. A non-transitory computer readable medium including one or more sequences of instructions that, when executed by one or more processors, causes the one or more processors to perform operations comprising:

obtaining, by a content management system, login context data from a user device, the login context data corresponding to an attempt to log in to a user account managed by the content management system;

creating, by the content management system, a fingerprint for the user device;

updating, by the content management system, a historical login context data repository based on the login context data, the historical login context data repository including historical login context data corresponding to a plurality of login attempts associated with the user account;

generating, by the content management system, a plurality of login metric values using a plurality of login metrics and the fingerprint associated with the user device based on the historical login context data for the user account stored in the historical login context data repository;

determining, by the content management system, that the user account is being shared among multiple users based on the plurality of login metrics; and in response to a determination that the user account is being shared among multiple users, initiating remedial action for the user account.

11. The non-transitory computer readable medium of claim 10, wherein creating, by the content management system, the fingerprint for the user device, comprises:

identifying characteristics of the user device that includes at least one of device language settings, display settings, accessories connected to the user device, web browser plugins, processor specifications, volatile memory size, non-volatile memory size, and subcomponent identifiers.

12. The non-transitory computer readable medium of claim 10, wherein the plurality of login metrics include a first login metric that is a login frequency metric, and wherein generating the plurality of login metric values using the login frequency metric comprises:

analyzing the historical login context data for the user account to determine a number of times a user logged in to the user account.

13. The non-transitory computer readable medium of claim 10, wherein the plurality of login metrics include a first login metric that is a browser types metric, and wherein generating the plurality of login metric values using the browser types metric comprises:

analyzing the historical login context data for the user account to determine a number of different browser types used by a user to log in to the user account.

14. The non-transitory computer readable medium of claim 10, wherein the plurality of login metrics include a first login metric that is a native clients metric, and wherein generating the plurality of login metric values using the native clients metric comprises:

analyzing the historical login context data for the user account to determine a number of different clients used by a user to log in to the user account.

15. The non-transitory computer readable medium of claim 10, wherein the plurality of login metrics include a first login metric that is a login sessions metric, and wherein generating the plurality of login metric values using the login sessions metric comprises:

analyzing the historical login context data for the user account to determine a number of different sessions used by a user to log in to the user account.

16. The non-transitory computer readable medium of claim 10, wherein the plurality of login metrics include a first login metric that is an anonymous proxy metric, and wherein generating the plurality of login metric values using the anonymous proxy metric comprises:

analyzing the historical login context data for the user account to determine a number of times a log in to the user account originated from an IP address associated with an anonymous proxy server.

17. The non-transitory computer readable medium of claim 10, wherein the plurality of login metrics include a first login metric that is a number of devices metric, and wherein generating the plurality of login metric values using the number of devices metric comprises:

analyzing the historical login context data for the user account to determine a number of different client devices used to log in to the user account over a threshold period of time.

18. A content management system comprising:

one or more processors; and a non-transitory computer-readable medium including one or more sequences of instructions that, when executed by the one or more processors, causes the content management system to:

obtain a historical login context data repository including historical login context data of a user device corresponding to a plurality of logins associated with a user account;

create, by the content management system, a fingerprint for the user device; and detect whether the user account is being shared among multiple users, wherein detecting whether the user account is being shared among the multiple users comprises:

generating a login metric value using a login metric based on the historical login context data for the user account and the fingerprint of the user device associated with the user account that are stored in the historical login context data repository,     determining the user account is being shared among the multiple users based on the login metric value, and     initiating remedial action for the user account when the user account is being shared among the multiple users.

19. The system of claim 18, wherein the login metric is a login frequency metric, and wherein generating the login metric value using the login frequency metric comprises:

analyzing the historical login context data for the user account to determine a number of times a user logged in to the user account.

20. The system of claim 18, wherein the login metric is a browser types metric, and wherein generating the login metric value using the browser types metric comprises:

analyzing the historical login context data for the user account to determine a number of different browser types used by a user to log in to the user account.

\* \* \* \* \*